April 23, 1940.          J. C. CROWLEY          2,197,995
VALVE
Filed April 6, 1937          2 Sheets-Sheet 1

INVENTOR.
JOHN C. CROWLEY
BY Kwis Hudson & Kent
ATTORNEYS

April 23, 1940.          J. C. CROWLEY          2,197,995
VALVE
Filed April 6, 1937          2 Sheets-Sheet 2

INVENTOR.
JOHN C. CROWLEY
BY
Kues Hudson & Kent
ATTORNEYS

Patented Apr. 23, 1940

2,197,995

UNITED STATES PATENT OFFICE 2,197,995

VALVE

John C. Crowley, Cleveland Heights, Ohio, assignor to The Dill Manufacturing Company, Cleveland, Ohio, a corporation of Ohio Application April 6, 1937, Serial No. 135,290

2 Claims. (Cl. 251—5)

This invention relates to a valve, and particularly to a valve which can be advantageously used, for example, in a fluid pressure line such as an air line, although it will be understood that the valve also has utility when used in other relationships where it is desired to control the passage of fluid under pressure.

An object of the invention is to provide a valve of this character which is simple and inexpensive in construction.

A further object is to provide a valve of the character specified, which does not require packing for the valve operating member.

Another object is to provide a valve of the character stated which is efficient in operation, and wherein there will be no sticking or binding together of portions of the valve.

Further and additional objects and advantages will become apparent hereinafter during the following detailed description of a number of embodiments thereof and which are illustrated in the accompanying drawings, wherein—

A valve embodying the present invention may be termed a straight flow valve, in that it can be advantageously used in a pressure fluid line such as an air line or in an air gun or in similar relations, wherein the pressure fluid flows through that portion of the line or gun containing the valve in a straight path.

Figure 1:
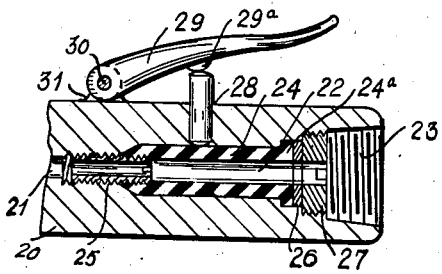
Fig. 1 is a sectional view through one form of valve embodying the invention with the valve shown as mounted in a fluid pressure line.
Figure 2:
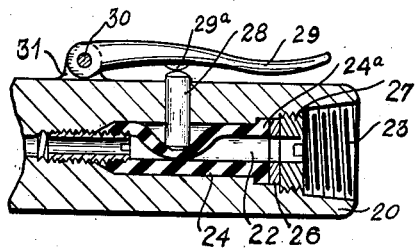
Fig. 2 is a view similar to Fig. 1 but showing the valve closed.

In Figs. 1 and 2 the member 20, preferably formed of metal, may be part of a pressure fluid line, and is provided with a bore 21 which communicates with an enlarged bore portion 22, in turn communicating with a threaded counterbore 23 by means of which the member 20 can be connected to a suitable fitting carried by a pressure fluid line or source of supply. The counterbore 23 at its inner end communicates with a smaller threaded counterbore for receiving a clamping nut later to be referred to. An elastic tube 24, preferably formed of rubber, is mounted in the enlarged bore portion 22 in the member 20 and said tube is tapered at one end to interfit with the tapered end of the bore portion 22, while its opposite end is provided with an annular head or flange 24a engaging an internal shoulder formed in the member 20. The tube or sleeve 24 is anchored in position in the member 20 by means of a threaded sleeve or bushing 25 that is screwed into the bore 21 in the member 20 and which has its threads digging into and interlocking with the tube 24 adjacent the tapered end thereof. A washer 26 engages the annular head or flange 24a of the tube and is held in clamping position with respect thereto by means of a nut 27 that is screwed into the reduced threaded counterbore at the inner end of the counterbore 23, as clearly shown in the drawings, said washer 26 and nut 27 being provided with centrally disposed openings lying in axial alignment with the passage through the tube 24, sleeves 25 and with the bore 21. It will be seen that the tube 24 is so anchored in the bore of the member 20 as to have a fluid pressure sealing engagement with the bore, wherefore no fluid will escape between the tube and the wall of the bore.

A pin or plunger 28 forming a valve actuating member is slidably positioned in an opening formed in the member 20 and has its inner end engaging the periphery of the tube 24, while its outer end projects laterally of the member 20 and is normally in engagement with a rounded knob 29a formed on an actuating lever 29 that is mounted on a pin 30 supported by upstanding lugs or ears 31 formed on the side of the member 20. When pressure fluid is flowing through the valve the pin or plunger 28 will be held in its outermost position, due to its engagement with the tube 24, and at such time the actuating lever will also be held in its outermost position, that is the position shown in Fig. 1. When the operator wishes to close the valve he depresses the actuating lever 29 toward the member 20 to force the pin or plunger inwardly of the member 20 so that the inner end of said plunger will deform the elastic tube 24 as illustrated in Fig. 2, which deformation of the tube acts to close the passage therethrough, since the tube is collapsed between the inner end of the plunger and the member 20 as will be well understood.

When the operator wishes pressure fluid to pass through the valve he merely releases the pressure of his hand from the actuating lever 29, whereupon the pressure of the pressure fluid will restore the tube to its original shape with the pin and actuating lever in their outermost position as indicated in Fig. 1.

Inasmuch as no fluid can escape between the tube 24 and the wall of the bore 22 in the member 20 no packing is required for the plunger 28, thus simplifying and reducing the cost of the valve over a valve wherein the actuating means must be packed.

Figure 3:
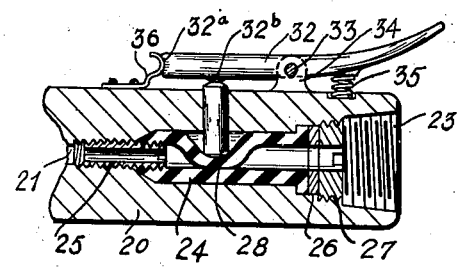
Fig. 3 is a view similar to Fig. 2 but showing a modified form of the valve with the valve closed.

It may be that in some instances it will be desirable for the operator to lock the valve closed and to remove his hand from the actuating lever. A form of valve embodying the invention constructed so as to have this characteristic is shown in Fig. 3, wherein the actuating lever 32 is pivoted intermediate its ends on a pin 33 supported by upstanding ears or lugs 34 carried by the outer side of the member 20. At one side of the pivotal mounting of the actuating lever 32 there is located a coil spring 35 arranged between the inner side of the lever and the side of the member 20 and acting to urge the lever about its pivot in a counterclockwise direction as viewed in the drawings. The end of the lever on the side of the pivot pin 33 opposite to the spring 35 is provided with an inwardly curved recess 32a which cooperates with a curved spring detent or holding member 36 secured to the side of the member 20 to hold the actuating lever in the position shown in Fig. 3, at which time the knob 32b formed on the inner side of the lever has depressed the plunger 28 to form the tube 24 and effect a closing of the valve. When the operator wishes to open the valve he merely presses the right hand end (as viewed in the drawings) of the actuating lever 32 inwardly against the action of the spring 35 which causes the recess 32a to snap away from the spring detent 36 and allows the lever to rock outwardly about its pivot in a clockwise direction, the pressure fluid then restoring the tube 24 to its normal shape and moving the plunger 28 outwardly.

Figure 4:
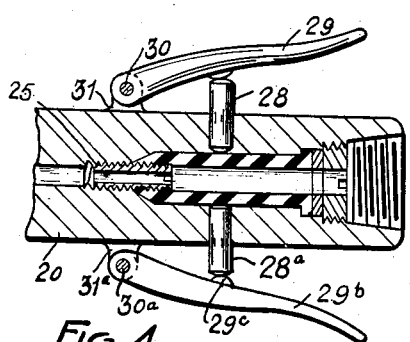
Fig. 4 is a view similar to Fig. 1 but showing a still different form of the valve.
Figure 5:
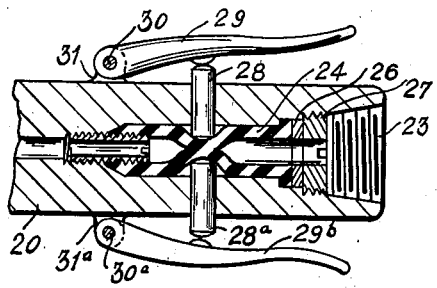
Fig. 5 is a view similar to Fig. 4 but shows the valve of Fig. 4 in closed position.
Figure 6:
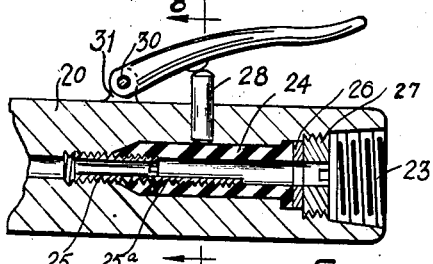
Fig. 6 is a sectional view similar to the previously referred to figures, but illustrates a still different form of valve.

In Figs. 4 and 5 a form of the invention is illustrated which is similar to that shown in Figs. 1 and 2, except that in place of the single actuating lever 29 arranged on one side of the member 20 a second actuating lever 29b is employed and said second lever 29b is pivotally mounted on a pivot pin 30a carried by ears or lugs 31a formed on the side of the member 20 diametrically opposite to the lugs or ears 31 forming the pivotal support for the lever 29. A plunger or pin 28a is slidably mounted in an opening formed in the side of the member 20 and lies in axial alignment with the pin 28, the outer end of the pin or plunger 28a cooperating with a rounded knob 29c formed on the inner side of the actuating lever 29b.

It will be seen that when the operator wishes to close the valve illustrated in Figs. 4 and 5 he grasps the actuating levers 29 and 29b and moves the same toward each other, whereupon the pins or plungers 28 and 28a are forced inwardly of the member 20 to deform the tube 24, as clearly shown in Fig. 5 to seal or close the valve and prevent the passage of pressure fluid therethrough.

It will be understood that when the operator releases his grip upon the actuating levers 29 and 29b the pressure fluid will restore the tube to its original configuration and will move the pins or plungers and the actuating levers outwardly to the position shown in Fig. 4.

Figs. 6 to 9 inclusive illustrate a still different form of the invention and one wherein it is proposed to prevent any likelihood of the tube sticking in deformed or closed position. It will be understood that when the tube is deformed or closed ordinarily there would be a rubber to rubber contact and such contact might cause the tube to stick together. In order to avoid this likelihood it is proposed to provide a rubber to metal contact when the tube is closed and a valve so constructed is shown in Figs. 6 to 9; otherwise this valve is the same as that shown in Fig. 1 and the corresponding parts are, therefore, designated by the same reference characters.

Figure 7:
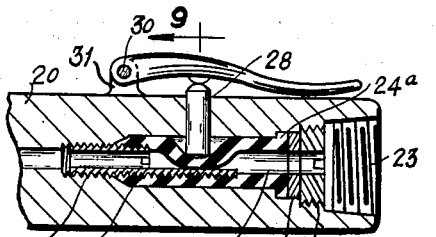
Fig. 7 is a view similar to Fig. 6 but showing the valve in closed position.
Figure 8:
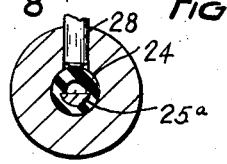
Fig. 8 is a sectional view taken on line 8—8 of Fig. 6 looking in the direction of the arrows.
Figure 9:
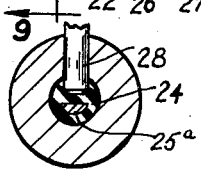
Fig. 9 is a sectional view taken on line 9—9 of Fig. 7 looking in the direction of the arrows.

In this modified form of valve the sleeve 25 is provided with an integral segmental portion 25a extending inwardly of the tube from the inner end of the sleeve and lying in alignment with the inner end of the pin or plunger 28 and having a flat inner surface. It will be seen that when the pin or plunger 28 is moved inwardly to deform the tube 24, as indicated in Figs. 7 and 9, the deformed portion of the tube will engage with the flat inner surface of the extension 25a of the sleeve 25 and hence there will be a rubber to metal engagement which will prevent any likelihood of the tube sticking in deformed or closed position.

Figure 10:
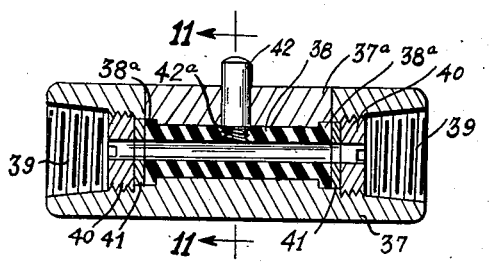
Fig. 10 is a sectional view through a still different form of valve embodying the invention and shows the valve mounted in a pressure fluid line with the valve in open position.
Figures 11, 12:
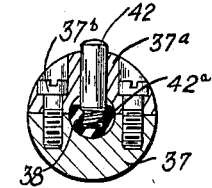
Fig. 11 is a sectional view taken substantially on line 11—11 of Fig. 10 looking in the direction of the arrows.
Fig. 12 is a view similar to Fig. 11 but shows the valve in closed position.

In the form of the invention shown in Figs. 10 to 12 inclusive a member 37 is used in place of the member 20 previously referred to. This member 37 intermediate its ends is cut-away on one side thereof and such cut-away portion is filled by a complementary part 37a which fits therein and is held in position by securing screws 37b, as clearly shown in Figs. 11 and 12. The member 37 with its complementary part 37a secured in position form a cylindrical passage or bore intermediate the ends of the member, in which is mounted a rubber tube 38 provided at its opposite ends with annular heads or flanges 38a which engage internal shoulders formed in the member, as clearly shown in Fig. 10. The opposite ends of the member 37 are provided with threaded attaching counterbores 39 at the bottoms of which are reduced threaded counterbores receiving clamping nuts 40, which, together with washers 41, clamp the tube 38 in position, and provide a seal against the escape of fluid around the tube.

A pin 42 is provided at its inner end with a reduced threaded or serrated portion 42a that is embedded in and vulcanized to the rubber tube 38. In assembling the valve the tube is positioned in the member 37, after which the complementary part 37a is positioned in the cut-away portion of the member 37, it being understood that in positioning the part 37a the pin 42 can be passed through an opening formed in said part and that said pin will have a sliding fit in said opening. When the part 37a has been thus positioned with the pin 42 projecting through the opening therein as shown in Fig. 10, said part is clamped to the member 37 by the screws 37b previously referred to. It will be seen that the tube 38 can be deformed and closed by depressing the pin or plunger 42, as indicated in Fig. 12 and that no packing is required for the pin since fluid cannot escape around the tube 38.

Figure 13:
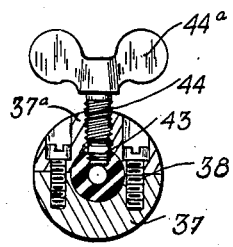
Fig. 13 is a view similar to Fig. 11 but illustrating a still further modification of the invention.

In Fig. 13 the valve is similar to that shown in Fig. 10 except that in place of the pin 42 a short plug 43 is embedded in and vulcanized to the tube 38 and extends a short distance into the opening in the part 37a. The opening in the part 37a is threaded outwardly of the outer end of the plug 43 and receives a screw 44 having at its outer end a suitable operating handle such as a wing nut 44a.

It will be understood that the inner end of the screw abuts the outer end of the plug and rotation of the screw 44 will cause an inward linear movement of the plug 37 but no rotative movement thereof and that when the screw 44 has been screwed inwardly sufficiently far the plug will deform the rubber tube 38 and close the valve.

Figure 14:
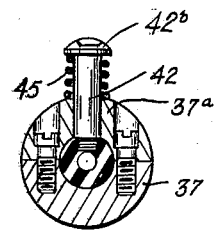
Fig. 14 is a view similar to Fig. 11, but likewise showing a different form of the invention.

The form of valve shown in Fig. 14 is similar to that shown in Fig. 10, except that the pin or plunger 42 has a head 42b secured thereto after the valve has been assembled, while a coil spring 45 surrounds the pin between the inner side of the head 42b and the part 37a of the member 37 which spring acts against the head 42b to maintain the pin in its outermost position when the valve is open.

Figure 15:
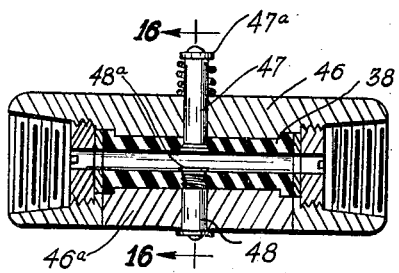
Fig. 15 is a view similar to Fig. 10 but illustrating a form of the invention different from any previously shown herein.
Figures 16, 17:
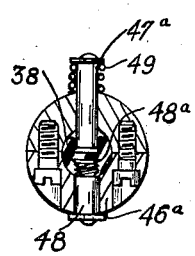
Fig. 16 is a sectional view taken substantially on line 16—16 of Fig. 15 looking in the direction of the arrows.
Fig. 17 is a sectional view similar to Fig. 16 but showing the valve closed.

In the form of valve shown in Figs. 15 to 17 inclusive the member 46 is similar to the member 37 described with respect to Fig. 10 and has a complementary removable part 46a like the part 37a previously referred to. The member 46 and the part 46a are provided with aligned openings therethrough to receive, respectively, a slidable pin or plunger 47 and a fixed plug 48. The pin or plunger 47 has its lower end embedded and vulcanized in the rubber tube 38, while the plug 48 has its inner end extending through the tube 38 and vulcanized in such position therein with the extreme inner end forming a flat metal surface 48a lying in the bore through the tube.

In assembling the valve shown in Figs. 15 to 17 inclusive the tube may be positioned in the member 46 and the pin or plunger passed through the opening therein, after which a coil spring 49 is mounted on the pin outwardly of the member 46 and then a head 47a secured to the outer end of the pin or plunger 47, it being understood that the spring 49 maintains the pin or plunger in the position shown in Fig. 15 when the valve is open. In mounting the part 46a in position the plug 48 is passed through the opening in said part and then the head 48b can be secured to the lower end of the plug as clearly indicated in Figs. 15 to 17.

It will be seen that depression of the pin or plunger 47 will deform the tube 38 and close the valve, the deformed portion of the tube in this instance contacting with the flat metal surface 48a at the inner end of the plug 48, wherefore a rubber to metal contact is provided which prevents the valve sticking in closed position.

Figure 18:
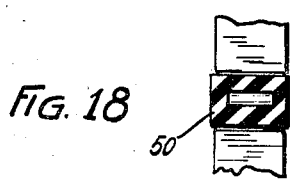
Figs. 18 and 19 are detached sectional views showing flexible tubes employed in the valve but of different cross-sectional configuration than the tubes previously illustrated herein, Fig. 18 being a transverse sectional view of the tube and Fig. 19 a fragmentary longitudinal sectional view thereof.
Figure 19:
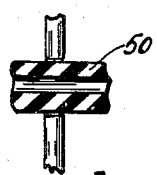

In Figs. 18 and 19 a rubber tube 50 is illustrated and which may be similar to the tubes 24 and 38 previously referred to, except that the tube 50 is shown as rectangular in cross-section, as distinguished from the tubes of cylindrical cross-section previously described.

From the foregoing it will be seen that valves embodying the present invention are extremely simple and inexpensive yet efficient for the purpose of controlling the passage of pressure fluid through the supply line or through any other conduit wherein the flow takes place in a straight path. It will also be noted that it is unnecessary to pack the actuating pins or plungers since the tubes form with the bores in the members of the pressure fluid lines a continuous conduit for the fluid and no fluid can escape between the tubes and the members.

Although a number of different forms of the invention have been illustrated and described herein, it should be understood that the invention is susceptible of various other modifications and adaptations within the scope of the appended claims.

Having thus described my invention I claim:

1. A valve of the character described comprising a member having a bore therethrough and provided with a laterally extending opening communicating with said bore, an elastic tube arranged in said bore and of less length than said bore, means for anchoring the opposite ends of said tube and sealing the same with respect to said bore to prevent fluid passing out of the bore and around said tube, a movable actuating member in said opening operable from exteriorly of the member and engaging said tube whereby inward movement of said actuating member deforms and closes said tube, a member extending within said tube and to a point diametrically opposite said opening and arranged to be engaged by that portion of the tube which is deformed when the actuating member is actuated to deform the tube.

2. A valve of the character described comprising a member having a bore therethrough and provided with a laterally extending opening communicating with said bore, an elastic tube arranged in said bore, a tubular member having a portion thereof secured in the bore and extending within one end of the elastic tube, said tubular member having a segmental extension located diametrically opposite to said opening, and a movable actuating member in said opening and operable from the exterior of the member and engaging said elastic tube whereby inward movement of said actuating member deforms and closes said elastic tube, the portion of said elastic tube deformed engaging the extension upon the said tubular member.

JOHN C. CROWLEY.